United States Patent [19]

Tsuchihashi et al.

[11] Patent Number: 4,517,653
[45] Date of Patent: May 14, 1985

[54] METHOD FOR CONTROLLING AN INDUSTRIAL ROBOT

[75] Inventors: Akira Tsuchihashi, Nagareyama; Kazuyoshi Teramoto, Funabashi, both of Japan

[73] Assignee: Hitachi, Ltd., Tokyo, Japan

[21] Appl. No.: 422,300

[22] Filed: Sep. 23, 1982

[30] Foreign Application Priority Data

Sep. 30, 1981 [JP] Japan ................................ 56-153708

[51] Int. Cl.³ ........................ G06F 15/46; G05B 19/42
[52] U.S. Cl. ..................................... 364/513; 318/568; 364/193; 901/3; 901/42
[58] Field of Search ........................ 364/513, 191–193; 318/568; 901/3, 4, 5, 42; 414/730

[56] References Cited

U.S. PATENT DOCUMENTS

| | | | |
|---|---|---|---|
| 3,909,600 | 9/1975 | Hohn | 364/193 X |
| 3,920,972 | 11/1975 | Corwin, Jr. et al. | 364/513 X |
| 4,420,812 | 12/1983 | Ito et al. | 364/513 |
| 4,433,382 | 2/1984 | Cunningham et al. | 364/513 X |

Primary Examiner—Joseph Ruggiero
Attorney, Agent, or Firm—Antonelli, Terry & Wands

[57] ABSTRACT

Dimensions of a plurality of works of the same specification are subtantially identical among the works. Thus, a teach work point on the work to be worked by an industrial robot and a teach reference point to specify the teach work point are taught to memory means of the industrial robot. In an automatic mode, an actual reference point on the work of the same specification is detected by a sensor and an actual work point of the work is determined based on a difference between the detected actual reference point and the teach reference point and the resulting actual work point is conveyed to the industrial robot.

8 Claims, 7 Drawing Figures

METHOD FOR CONTROLLING AN INDUSTRIAL ROBOT

BACKGROUND OF THE INVENTION

1. Field of the Invention

The present invention relates to a method for controlling an industrial robot having a sensor for sensing a work position, and more particularly to a method for controlling an industrial robot suitable for sequentially working a plurality of substantially identical workpieces.

2. Description of the Prior Art

A method for controlling an industrial robot by detecting an attitude of work by a sensor and correcting a route of the industrial robot to match to the attitude of work has been proposed by the U.S. patent application Ser. No. 360,846 by Takashi Kogawa.

In the proposed method, in accordance with an instruction to detect work points at a plurality of positions for each work, the sensor detects the work points, and the route of movement of an object to be controlled by the robot is determined in accordance with the detected data.

Since the work point detection must be done at one or more points per peculiar point i.e. corner point on the route along which the object to be controlled by the robot is moved, a long time is required to detect all points. During the work point detection, the industrial robot, in many cases, cannot carry out its intended work. Accordingly, the work efficiency is very low.

SUMMARY OF THE INVENTION

It is an object of the present invention to provide a method for controlling an industrial robot with a high work efficiency.

It is another object of the present invention to provide a method for controlling an industrial robot which permits a perfect work by the robot even if a work piece is more or less offset from its normal position.

The other objects of the present invention and resulting advantages will be readily understood from the following description.

In general, for a plurality of works of the same specification, dimensions of elements are substantially identical among the works.

Accordingly, when a plurality of substantially identical workpieces each having working points and a reference point are arranged at a specified orientation, the working points on a workpiece which are at particular distances from the reference point can be determined by calculation if the position of the reference point is deteced by a sensor.

By providing two reference points and detecting positions thereof by the sensor, the working points can be determined by calculation without specifying the orientation of the works.

In accordance with the present invention, a plurality of substantially identical workpieces each having the working points and the reference point are sequentially worked by the industrial robot in the following manner.

In a first step, tentative or provisional working points and tentative or provisional reference points are determined and position data for these points are stored.

In the first step, if there is only a single reference point, the workpieces are arranged in a specified orientation and the objects to be position-controlled by the industrial robot are arranged at the respective working points and the reference point, and displacements of operation axes of the industrial robot are stored or an instruction issued to arrange the position-controlled objects to the respective working points and the reference point is stored. When the workpiece is to be worked, the information stored in the memory means in the first step is read out and the industrial robot is controlled by the read information. However, when the next workpiece is to be worked, the orientation of the next workpiece is identical to that of the previous work but the position of the reference point is different in many cases.

Thus, in a second step following the first step, the actual position of the reference point of the next workpiece is detected by the sensor, and a distance and a direction from the provisional reference point to the actual reference point are calculated based on the stored data on the provisional reference point and the data on the actual reference point detected by the sensor.

The actual reference point of the workpiece may be directly detected by the sensor, or it may be determined by calculation by detecting a position which is at a given distance from the reference point. For example, when a center of a cylinder is used as the reference point, three points on a periphery of the cylinder may be detected and the actual reference point may be determined by calculation based on the three detected position data.

In a third step following the second step, the actual working points of the workpiece are determined based on the stored data on the provisional working points and the distance and the direction determined in the second step. The object to be controlled by the industrial robot is then moved to the actual working point.

The object to be controlled by the industrial robot may be moved to the plurality of actual working points of the workpiece or the points between the working points may be interpolated by a straight line or a selected curve.

When two reference points are used, the orientation of the workpiece need not be specified.

In accordance with the present invention, the reference points are determined in the manner described above so that the positions of the working points can be determined by calculation. Accordingly, the work time by the sensor can be reduced and the working efficiency is improved. Even if the work point setting is more or less offset from the normal point, the work by the robot can be exactly done.

DESCRIPTION OF THE PREFERRED EMBODIMENTS

Figure 3:
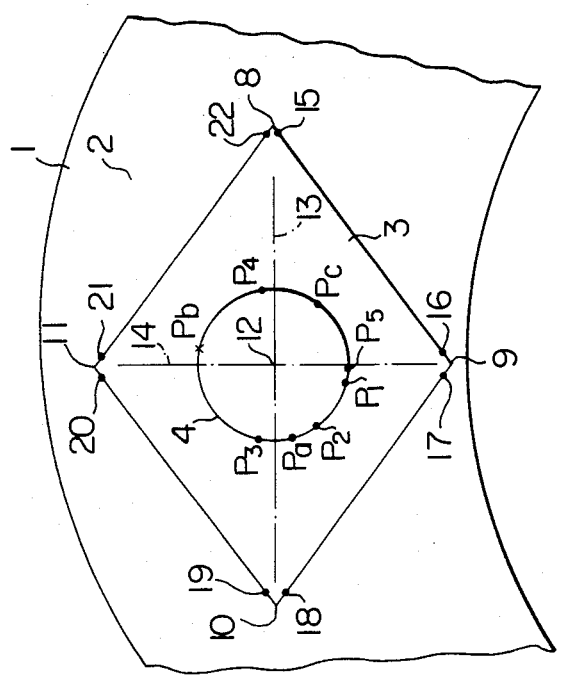
FIGS. 3 and 4 show a plan view and a front view of a workpiece which is worked in accordance with the method of the present invention.
Figure 1:
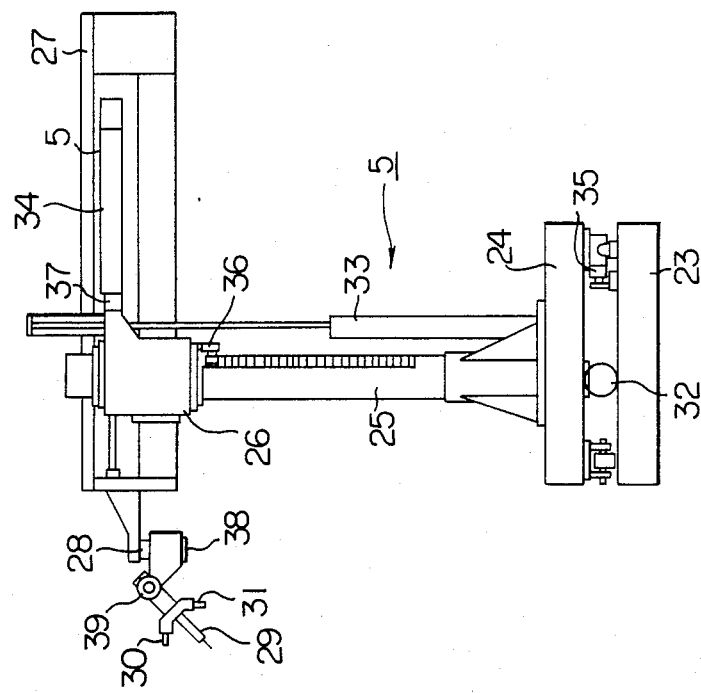
FIG. 1 shows a front view of an industrial robot used to practice the method of the present invention.
Figure 2:
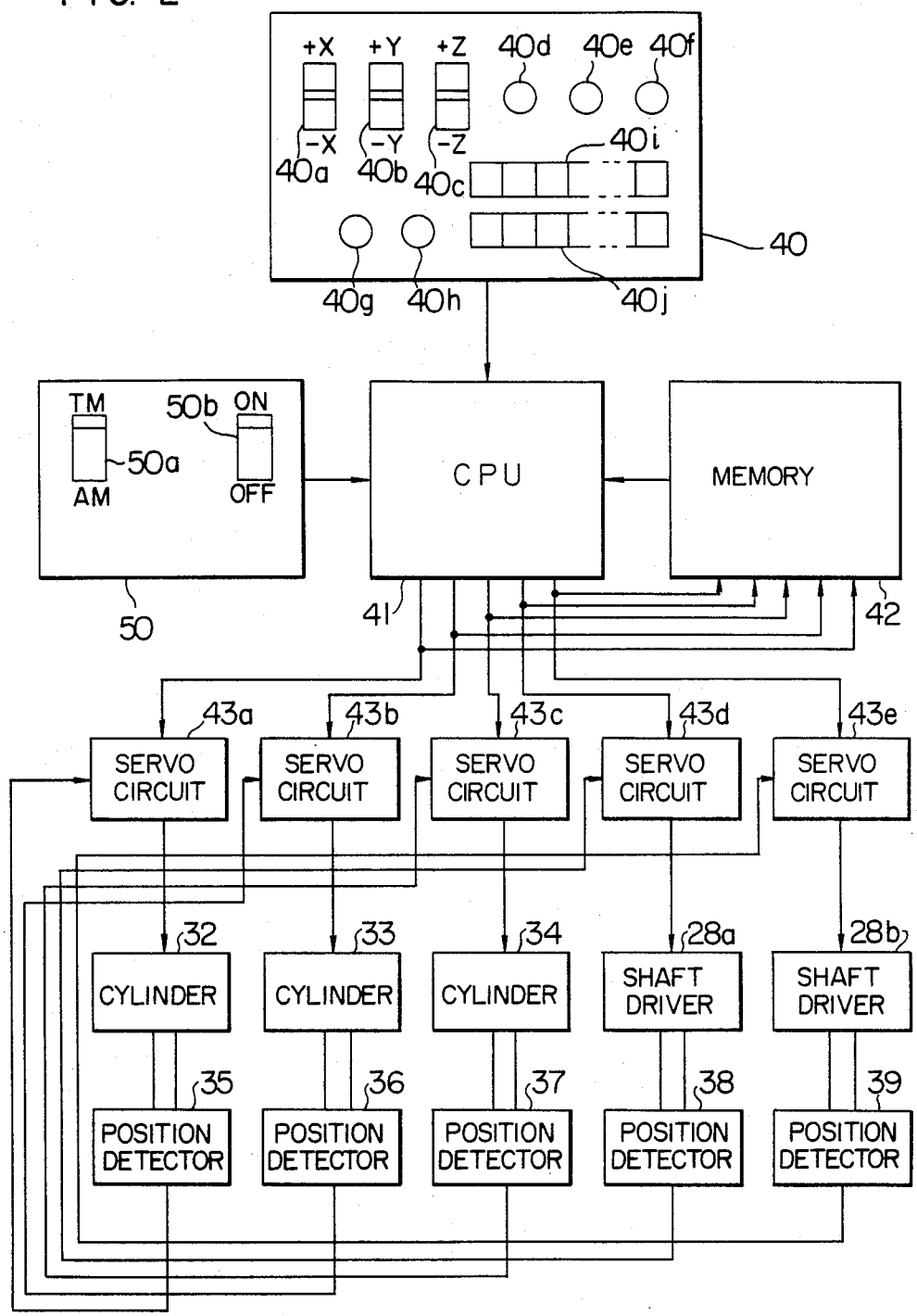
FIG. 2 shows a block diagram of an embodiment of a control unit of the industrial robot.

One embodiment of the method of the present invention in which a work shown in FIG. 3 is welded by a welding robot shown in FIGS. 1 and 2 is now explained.

Figure 4:
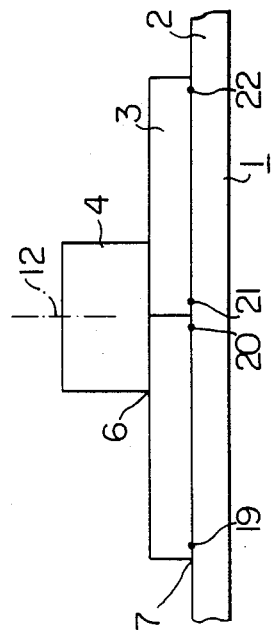

A workpiece 1 comprises a parent metal 2, a diamond-shaped intermediate member 3 and a cylindrical boss 4. The intermediate member 3 is positioned between the parent metal 2 and the boss 4 as shown in FIG. 4. A joint corner 6 of the boss 4 and the intermediate member 3 and a joint corner 7 of the intermediate member 3 and the parent metal 2 are welded by a welding robot 5. The intermediate member 3 is tentatively welded to the base 2 at corners 8, 9, 10 and 11, and the boss 4 is positioned such that a center 12 thereof is at a crosspoint of lines 13 and 14 connecting the corners 8 and 10 and the corners 9 and 11, respectively.

It is assumed that a plurality of working 1 are oriented so that lines 14 thereof are specifically oriented. The lines 14 of the respective works 1 may be shifted in parallel from each other, but they are not rotated in the crossing direction.

The center 12 of the boss 4 on the workpiece 1 is selected as a reference point and corners 15–22 and peripheral contact points $P_1$–$P_5$ of the boss 4 and the intermediate member 3 are selected as work points.

Referring to FIG. 1, the robot 5 comprises a base 23, a movable table 24 which moves on the base 23, a post 25 extending normally from the movable table 24, a slide block 26 which vertically moves in fitting relation to the post 25, an arm 27 which is horizontally movable on the slide block 26 orthogonally to the direction of movement of the movable table 24, and a two-axes rotary actuator 28 mounted at an end of the arm 27. A welding torch 29 and sensors 30 and 31 are mounted at an end of the two-axes rocking motor. The sensors 30 and 31 are explained in detail in the U.S. Pat. No. 4,205,217. The movable table 24 is driven by a cylinder 32, the slide block 26 is driven by a cylinder 33 and the arm 27 is driven by a cylinder 34.

Positions and attitudes of the movable table 24, the slide block 26, the arm 27 and the two-axes rocking motor 28 (having shaft drivers 28a and 28b) are detected by position detectors 35–39 shown in FIGS. 1 and 2.

A teaching box 40 has three-position switches 40a, 40b and 40c for instructing directions of operation, a teach point writing push button 40d, a tentative reference point writing push button 40e, a tentative work point writing push button 40f, route selection switches 40g and 40h, push buttons 40i for setting a welding current and push buttons 40j for setting a welding rate. When the three-position switch 40a is thrown to a +X position, the welding torch 29 is moved in a positive direction along an X-axis on an orthogonal coordinate, and when the switch 40a is thrown to a −X position, it is moved in a negative direction. When the three-position switch 40a is thrown to a neutral position, the welding torch 29 does not move along the X-axis. The three-position switch 40b serves to selectively move the welding torch 29 in a +Y or −Y direction, and the three position switch 40c serves to selectively move the welding torch in a +Z or −Z direction.

The push button 40d is pushed when the end of the welding torch 29 has reached a teach position by actuating the three-position switches 40a, 40b and 40c. When it is depressed, an instruction signal which a central processing unit 41 currently issues to servo circuits 43a–43e is written into memory means 42. The servo circuits 43a–43e supply error signals representing differences between the instruction signal and signals from position detecting means 35–39 to the cylinders 32–34 and the two-axes rocking motor 28.

The tentative reference point writing push button 40e is used to write the tentative reference point. It is depressed when the end of the welding torch 29 has reached a desired reference point by actuating the switches 40a, 40b and 40c.

The tentative work point writing push button 40f is used to write a tentative work point. It is depressed when the end of the welding torch 29 has reached a desired work point by actuating the switches 40a, 40b and 40c.

The route selection switch 40g serves to write information for causing the end of the welding torch 29 to move between two consecutive or specified tentative work points while linearly interpolating therebetween, into the memory means 42. When the push button 40e or 40f is depressed, the signal which the central processing unit 41 currently issues to the servo circuits 43a–43e is written into the memory means 42.

The route selection switch 40h serves to write information for causing the end of the welding torch 29 to move among three consecutive or specified tentative work points while arcuately interpolating therebetween.

Numeral 50 denotes a central instruction unit which has a mode selection switch 50a and a power switch 50b. In a teaching mode, the switch 50a is thrown to a TM position, and in an auto-mode, the switch 50 is thrown to an AM position.

Figure 7:
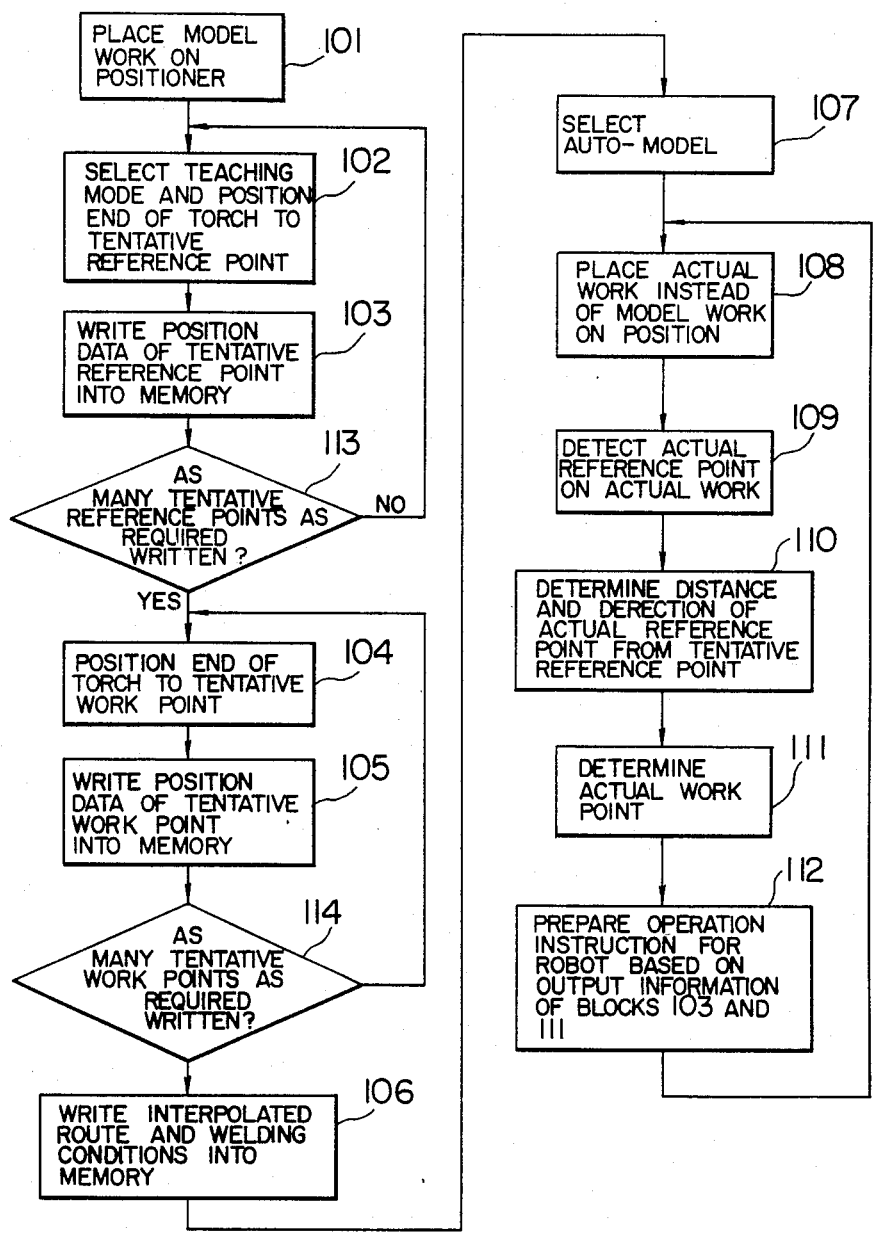
FIG. 7 shows a flow chart of steps in accordance with the method of the present invention.

An operator first sets a model work on a positioner (not shown) as shown by a block 101 in FIG. 7. Then, in a block 102 of FIG. 7, the switch 50a is thrown to the position TM to select the teaching mode so that the teaching box 40 issues an instruction to operate the central processing unit 41 and the servo circuits 43a–43e to drive the movable table 24, the slide block 26, the arm 27 and the two-axes rocking motor 28 so that the end of the torch 29 is exactly positioned to the tentative reference point 12.

In a block 103 of FIG. 7, the push button 40e is depressed so that the instruction which the central processing unit 41 currently issues to the servo circuits 43a–43e to drive the movable table 24, the slide block 26, the arm 27 and the two-axes rocking motor 28 is stored in the memory means 42.

In a block 104 of FIG. 7, the teaching box 40 instructs to position the end of the torch 29 to the points $P_1$–$P_5$ on the periphery of the boss 4 which connect to the intermediate member 3. At the respective points $P_1$–$P_5$, the push button 40f is depressed in a block 105 to store in the memory means 42 the instruction which the central processing unit 41 has issued to the servo circuits 43a–43e to position the end of the torch 29 to the points $P_1$–$P_5$. The route selection switch 40h is depressed to store the instruction in the memory means 42 such that the end of the torch 29 is moved between the points $P_1$ and $P_3$ and between the points $P_3$ and $P_5$ while arcuately interpolating by radii equal to distances from the tentative reference point 12 to the respective points $P_1$–$P_5$. Appropriate ones of the push buttons 40i and 40j are depressed to write the instructions for the welding current and the welding rate in the memory means 42. The teaching box 40 then instructs to position the end of the torch 29 to the points 15–22 which are close to the corners 8–11 on the periphery of the intermediate member 3 which contact to the parent material 2. The push button 40f is depressed at the respective points 15–22 to store in the memory means 42 the instructions which the central processing unit 41 has issued to the servo circuits 43a–43e to position the end of the torch 29 to the points 15–22. The push button 40g is depressed to write an instruction in the memory means 42 such that the welding torch 29 is moved between the points 15 and 16, between the points 17 and 18, between the points 19 and 20 and between the points 21 and 22 while linearly interpolating therebetween (a block 106 in FIG. 7). Thus, the first step is completed.

By reading out the instructions for the work written in the memory means 42, the joining corner 6 of the boss 4 and the intermediate member 3 and the joining corner 7 of the intermediate member 3 and the parent material 2 can be welded. However, after the completion of the welding of the work 1, if a work of the same specification as the work 1 is arranged with its line 14 being in parallel to the line 14 of the previous work 1, the welding cannot be effected by merely controlling the industrial robot in accordance with the content stored in the memory means 42.

However, if the position of the reference point 12 of the new work is determined, the welding positions of the new work can be determined by calculation.

However, the work is not shaped to allow direct detection of the reference point 12 by the sensors 30 and 31. Accordingly, in order to determine the reference point, an instruction is previously written in the memory means 42 to determined three points $P_a$, $P_b$ and $P_c$ on the periphery of the boss 4 of the new work by the sensors 30 and 31.

In a block 107 of FIG. 7, the switch 50a is thrown to the position AM to select the automode. Then, in a block 108, an actual work instead of the model work is placed on the position. A reference point of the actual work is detected in a block 109. In order to detect the reference point, the joining corner of the boss 4 and the intermediate member 3 is detected by the sensors 30 and 31. The detection is made by approaching the sensor 31 to the intermediate member 3 and the sensor 30 to the periphery of the boss 4 until outputs of the sensors reach a predetermined value.

When the coordinates of the three points $P_a$, $P_b$ and $P_c$, that is, $(X_a, Y_a, Z_a)$, $(X_b, Y_b, Z_b)$ and $(X_c, Y_c, Z_c)$ are determined, an instruction to determine the reference point 12 based on the position data has been stored in the memory means 42. The Z-axis positions of the points $P_a$, $P_b$ and $P_c$ are not significantly different. Accordingly, the reference point $(X_o, Y_o, Z_o)$ can be determined by solving the following equations by the central processing unit 41.

$$\left.\begin{array}{l}(X_a - X_o)^2 + (Y_a - Y_o)^2 + (Z_a - Z_o)^2 = C^2 \\ (X_b - X_o)^2 + (Y_b - Y_o)^2 + (Z_b - Z_o)^2 = C^2 \\ (X_c - X_o)^2 + (Y_c - Y_o)^2 + (Z_c - Z_o)^2 = C^2\end{array}\right\} \quad (1)$$

$$\frac{Z_a + Z_b + Z_c}{Z} = Z_o$$

Assuming that a coordinate of the reference point of the first work or the tentative reference point stored in the memory means 42 is (X, Y, Z), the central processing unit 41 can determine a distance and a direction ΔX, ΔY, ΔZ) between the tentative reference point and the actual reference point $(X_o, Y_o, Z_o)$ of the new work from the following equations, in a block 110.

$$\left.\begin{array}{l}\Delta X = X - X_o \\ \Delta Y = Y - Y_o \\ \Delta Z = Z - Z_o\end{array}\right\} \quad (2)$$

Thus, the second step is completed.

The resulting data is acted on the initial work points $P_1$–$P_5$ stored in the memory means 42 and the points 15–22 or the tentative work points to solve the equations (3) by the central processing unit 41 to determine the actual work points of the new work in a block 111.

Assuming that a coordinate of the tentative work point is $(X_\alpha, Y_\alpha, Z_\alpha)$, a coordinate $(X_\beta, Y_\beta, Z_\beta)$ of the actual work point can be determined from $$\left.\begin{array}{l}X_\beta = X_\alpha - \Delta X \\ Y_\beta = Y_\alpha - \Delta Y \\ Z_\beta = Z_\alpha - \Delta Z\end{array}\right\} \quad (3)$$

The central processing unit 41 instructs to position the end of the torch 29 to the actual work point $(X_\beta, Y_\beta, Z_\beta)$ and activates the servo circuits 43a–43e to drive the movable table 24, the slide block 26, the arm 27 and the two-axes rocking motor 28 so that the outputs from the detection means 35–39 reach the instructed values.

When the linear or non-linear interpolation between the actual work points is required, the central processing unit 41 issues the instruction necessary to the interpolation and the end of the torch 29 follows the instruction. Thus, the third step is completed (block 112). Blocks 113 and 114 indicate setting of as many tentative reference points and tentative work points as required. The linear interpolation and the non-linear interpolation are described in detail in the U.S. Pat. No. 4,179,602 and hence they are not explained here.

Figure 5:
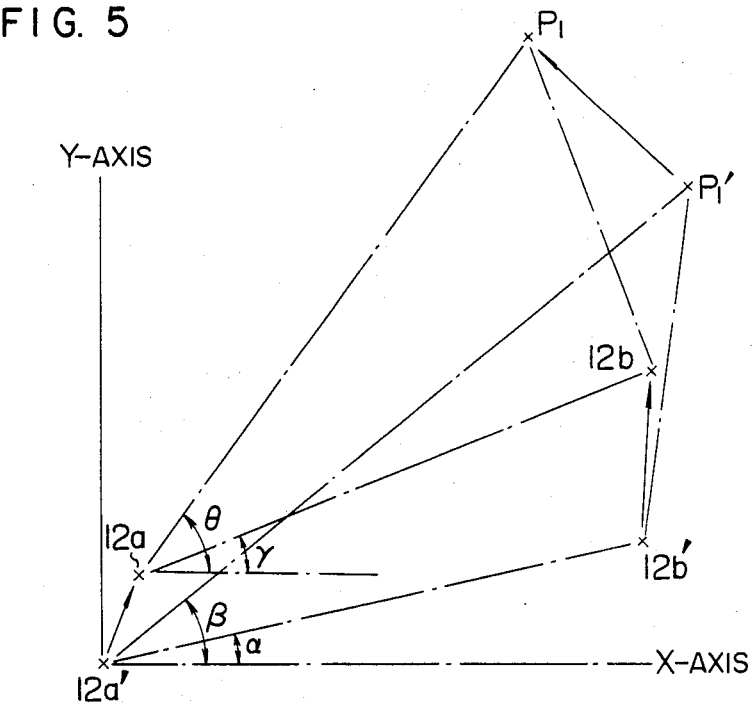
FIG. 5 shows a diagram for explaining another embodiment.

In the above description, the number of reference points is one. When the work has two reference points detectable by the sensors, the orientation of the work need not be specified. Referring to FIG. 5, let us assume that coordinates of two tentative reference points 12a' and 12b' are $(X_1', Y_1', Z_1')$ and $(X_2', Y_2', Z_2')$, respectively and a coordinate of a tentative work point $P_1'$ is $(X_3', Y_3', Z_3')$. Those coordinates or data for allowing to determine those coordinates are determined in the first step and stored in the memory means 42.

Assuming that coordinates of actual reference points 12a and 12b corresponding to the tentative reference points 12a' and 12b' determined by the sensors 30 and 31 are $(X_1, Y_1, Z_1)$ and $(X_2, Y_2, Z_2)$, respectively, a coordinate $(X_3, Y_3, Z_3)$ of an actual work point $P_1$ is determined in the following manner. In many cases, one may assume that $$Z_3 = Z_3' = Z_1 = Z_1' = Z_2 = Z_2'.$$

Under this condition, a distance l between $P_1$ and $12a$ is determined. Since the distance l is equal to a distance between $P_1'$ and $12a'$, it can be determined from the following equation.

$$l = \sqrt{(X_1' - X_2')^2 + (Y_1' - Y_2')^2} \quad (4)$$

An angle α between the X-axis and a line connecting the points 12b' and 12a' is determined from $$\alpha = \tan^{-1}\frac{Y_2' - Y_1'}{X_2' - X_1'} \quad (5)$$

An angle β between the X-axis and a line connecting the points $P_1'$ and 12a' is determined from $$\beta = \tan^{-1}\frac{Y_3' - Y_1'}{X_3' - X_1'} \quad (6)$$

An angle γ between the X-axis and a line connecting the points 12b and 12a is determined from $$\gamma = \tan^{-1}\frac{Y_2 - Y_1}{X_2 - X_1} \quad (7)$$

Thus, an angle θ between the X-axis and a line connecting the points $P_1$ and 12a is given by $\theta = \beta - \alpha + \gamma$. Accordingly, $$X_3 = l \cos\theta + X_1 \quad \ldots (8)$$

$$Y_3 = l \sin\theta + Y_1 \quad \ldots (9)$$

$$Z_3 = Z_1' = Z_2'$$

In this manner, the work point can be determined.

The present invention is not limited to the illustrated embodiments but various modifications and changes may be made.

For example, the robot is not limited to a welding robot but it may be a robot which applies bond material to the respective work points or points between the work points.

The sensor may contact the work to detect the position of the work, as shown in the U.S. Pat. No. 4,042,161.

In arc welding, a sensor which detects the position of the work by detecting a change in an arc voltage or arc current such as that shown in the U.S. Pat. Nos. 4,249,062 and 4,302,655 may be used.

Figure 6:
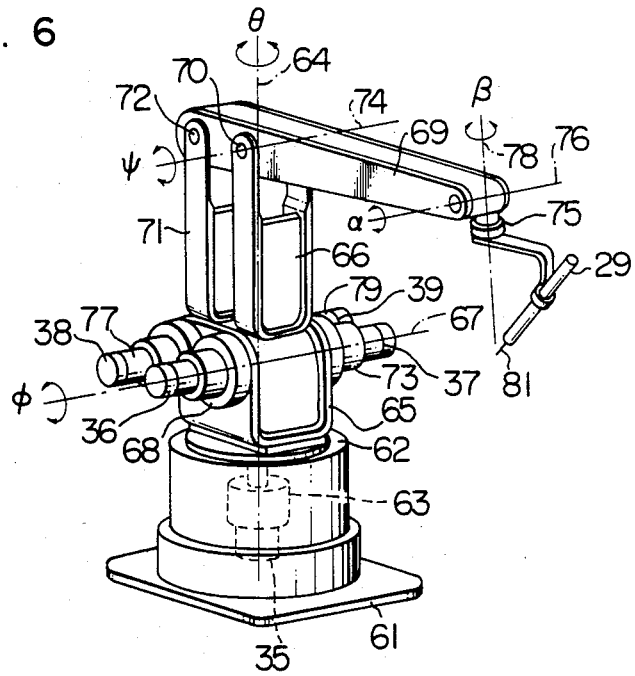
FIG. 6 shows a perspective view of another embodiment of the industrial robot used to practice the method of the present invention.

The robot is not limited to an orthogonal coordinate type but it may be a polar coordinate type or an articulate coordinate type. An example of the articulate type is explained with reference to FIG. 6. Numeral 61 denotes a base and numeral 62 denotes a rotary table. The rotary table can be rotated by underlying drive means 63 around a vertical axis 64 in the direction θ. A U-shaped support 65 is fixed on the rotary table 62. A first arm 66 is supported to allow pivotal movement around an axis 67 in the direction φ. Numeral 68 denotes drive means for driving the first arm 66 in the direction φ. A second arm 69 is pivoted by a pin 70 at an upper end of the first arm 66. A rear lever 71 is arranged in parallel to the first arm 66, and one end thereof is pivoted to the second arm 69 by a pin 72 and the other end is pivoted to one end of a lower lever, not shown. The other end of the lower lever is driven by drive means 73 on the axis 67. The first arm 66, the second arm 69, the rear lever 71 and the lower lever form a parallelogram link. Accordingly, when the drive means 73 is activated, the second arm is rotated around an axis 74 of the pin 70 in the direction ψ.

Drive means 77 for rotating a wrist 75 around an axis 76 in the direction α and drive means 79 for rotating the wrist 75 around an axis 78 in the direction β are provided at pivoting point of the rear lever 71 and the lower lever, not shown. The mechanism is disclosed in U.S. Ser. No. 196,252 filed on Oct. 10, 1980 for transmitting the power of drive means 77 and 79 to the wrist 75 to rotate it in the directions α and β, respectively.

A welding torch 29 is mounted on the wrist 75, and a crosspoint 81 of an axis of the torch 29 and the axis 78 is a point to be route-controlled. A moving body is a five-axes structure having the rotary table 62, the first arm 66, the second arm 69 and the wrist 75.

Encoders 35, 36, 37, 38 and 39 as position detecting means are mounted on the drive means 63, 68, 73, 77 and 79 to detect the rotational angles of the drive means 63, 68, 73, 77 and 79, respectively.

We claim:

1. A method for controlling an industrial robot which sequentially works a plurality of substantially identical workpieces at working points thereof measured with respect to at least one reference point thereof, comprising the steps of:
teaching provisional working points and at least one provisional reference point by sensing a portion of a first one of the workpieces and storing position data of said provisional working points and said provisional reference point;
determining a position of an actual reference point for another of said workpieces by sensing a portion of said other workpiece by a sensor attached to a hand of said industrial robot and determining by calculation a distance and direction from said provisional reference point to said actual reference point based on the stored data; and
determining actual working points of said other workpiece based on the stored data of said provisional working points and said distance and direction to move a working hand of said industrial robot to said actual working points.

2. A method for controlling an industrial robot according to claim 1 wherein said steps of teaching at least one provisional reference point and of determining a position of an actual reference point each include detecting positions of three points on a periphery of a ring concentric to the respective reference point and determining the respective reference point by calculation based on the three detected position data.

3. A method for controlling an industrial robot according to claim 1 or 2 wherein said provisional reference point is one in number.

4. A method for controlling an industrial robot according to claim 1 or 2 wherein said provisional reference points are two in number.

5. A method for controlling an industrial robot according to claim 1 or 2 wherein said provisional reference point is a part of said provisional working points.

6. A method for controlling an industrial robot according to claim 1 wherein a route between said working points is interpolated by said object to be controlled.

7. A method for controlling an industrial robot according to claim 6 wherein said route interpolation is a linear interpolation.

8. A method for controlling an industrial robot according to claim 6 wherein said route interpolation is an arcuate interpolation.

* * * * *